United States Patent
Muegge

(10) Patent No.: US 8,042,982 B2
(45) Date of Patent: Oct. 25, 2011

(54) HEADLIGHT FOR A MOTOR VEHICLE

(75) Inventor: Martin Muegge, Geseke (DE)

(73) Assignee: Hella KGaA Hueck & Co., Lippstadt (DE)

( * ) Notice: Subject to any disclaimer, the term of this patent is extended or adjusted under 35 U.S.C. 154(b) by 276 days.

(21) Appl. No.: 12/276,769

(22) Filed: Nov. 24, 2008

(65) Prior Publication Data

US 2009/0135621 A1    May 28, 2009

(30) Foreign Application Priority Data

Nov. 27, 2007 (DE) .......................... 10 2007 057 399

(51) Int. Cl.
F21V 7/04 (2006.01)
(52) U.S. Cl. ...................................... 362/612; 362/621
(58) Field of Classification Search .................. 362/612, 362/621, 606, 607, 628, 613
See application file for complete search history.

(56) References Cited

U.S. PATENT DOCUMENTS

| | | |
|---|---|---|
| 6,805,468 B2 | 10/2004 | Itoh et al. |
| 2003/0086276 A1 | 5/2003 | Ohtsuka et al. |
| 2004/0130903 A1 | 7/2004 | Chen |
| 2005/0117236 A1 | 6/2005 | Tanaka et al. |
| 2006/0062016 A1* | 3/2006 | Dejima et al. ................ 362/600 |
| 2007/0297191 A1* | 12/2007 | Sampsell ...................... 362/602 |

FOREIGN PATENT DOCUMENTS

| | | |
|---|---|---|
| DE | 19939087 A1 | 2/2001 |
| DE | 69809922 T2 | 8/2003 |
| DE | 10207694 A1 | 11/2003 |
| DE | 202004008681 U1 | 9/2004 |
| DE | 102004048669 A1 | 5/2005 |
| DE | 102005046538 A1 | 5/2007 |
| EP | 1167870 A2 | 1/2002 |
| GB | 2324364 A | 10/1998 |
| JP | 2004111352 A | 4/2004 |
| WO | 9908042 A1 | 2/1999 |

* cited by examiner

Primary Examiner — Julie Shallenberger
(74) Attorney, Agent, or Firm — Patent Central LLC; Stephan A. Pendorf

(57) ABSTRACT

This present invention relates to a lighting device for vehicles which comprises a flat type light conducting body having two opposed flat sides at which light is transmitted from a light coupling or input side of said body to a light decoupling or output side thereof by total reflection, and a narrow side at the light input end along which a plurality of spaced-apart light elements are fitted for light input into the light conducting body, wherein said narrow side extends in at least an extension plane perpendicular to the flat sides and the narrow side is uneven at least in a light input section thereof that constitutes a light input position.

1 Claim, 9 Drawing Sheets

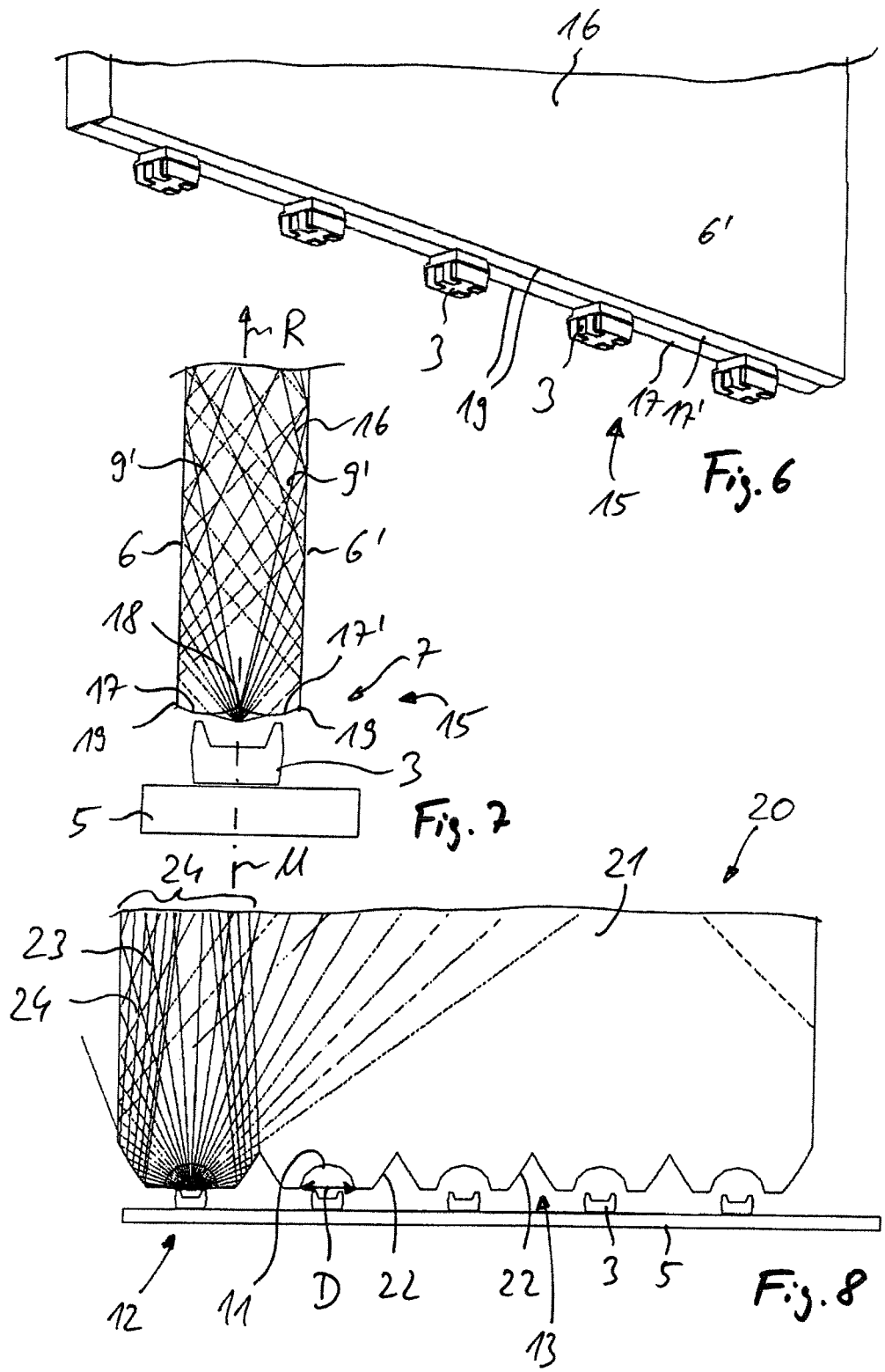

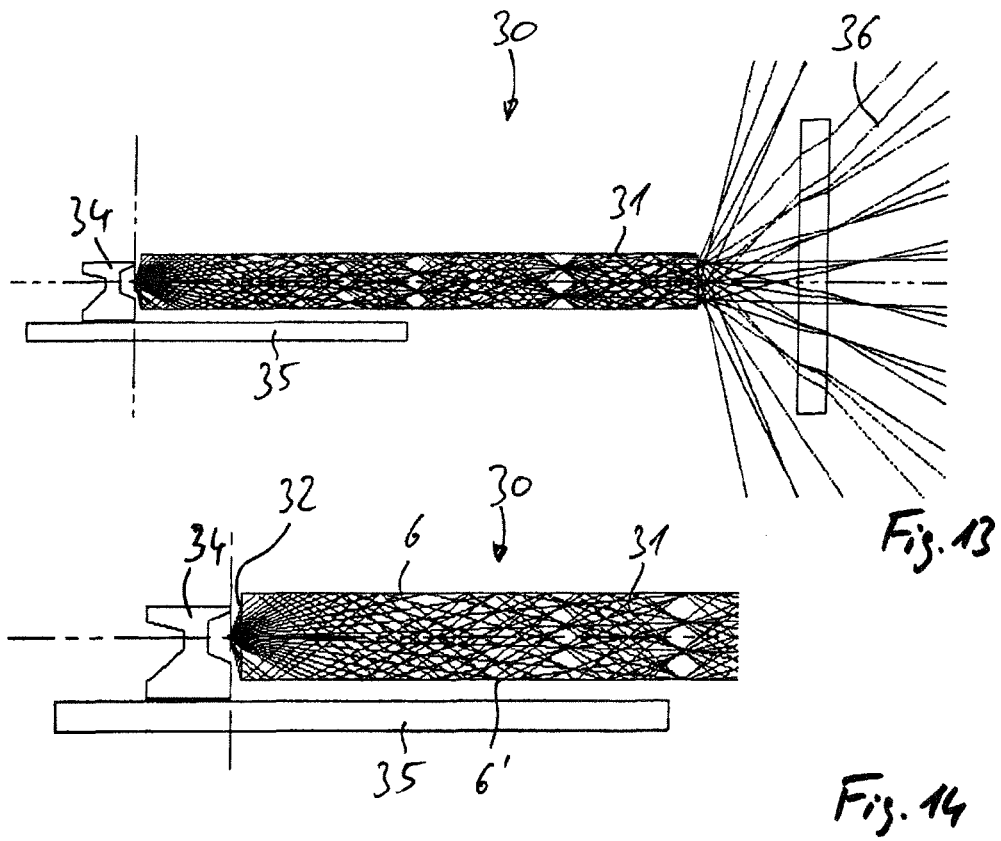
Fig. 13
Fig. 14
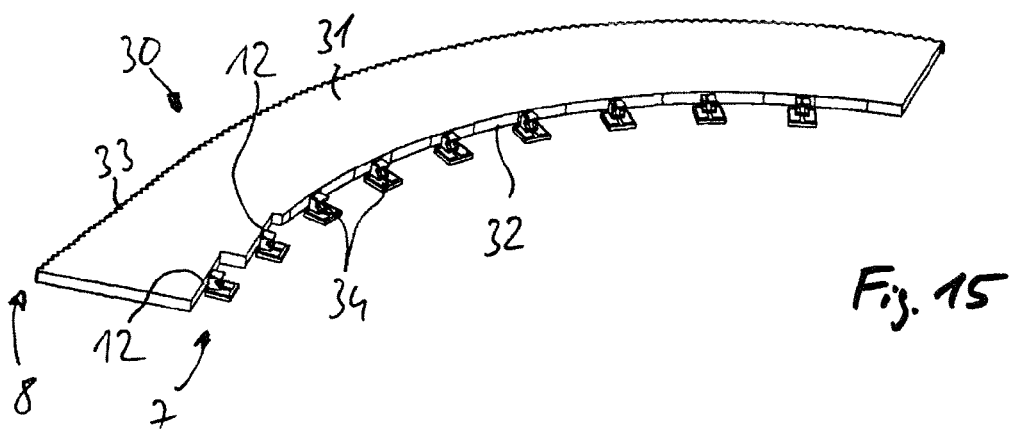
Fig. 15

HEADLIGHT FOR A MOTOR VEHICLE

BACKGROUND OF THE INVENTION

1. Field of the Invention

This present invention relates to a lighting device for vehicles which comprises a flat type light conducting body having two opposed flat sides at which light is transmitted from a light coupling or input side of said light conducting body to a light decoupling or output side thereof by total reflection, and a narrow side at the light input end along which a plurality of spaced-apart light elements are fitted for light input into the light conducting body, said narrow side extending in at least an extension plane perpendicular to the flat sides.

2. Related Art of the Invention

Prior known from DE 10 2005 018 121 A1 is a lighting device for vehicles which comprises a flat type light conducting body and a plurality of light elements that are arranged in a row on one of the narrow of the flat type conducting body. The light conducting body has opposed flat sides of which one is structured such as to provide a relatively homogeneous illumination face ("light curtain"). The light elements are disposed in one common plane and at constant spacings from one of the narrow sides of the flat type lights conducting body. It is due to said spaced-apart arrangement of the light elements that a light input zone of reduced radiant intensity is created between said light elements in the narrow-side region that has a triangular light input zone as viewed in longitudinal section of the light conducting body. Unless a light output zone of the flat type conducting body is disposed on a flat side like in the arrangement according to DE 10 2005 018 212 A1, but on a narrow side of the light conducting body that is opposite the light input side, then the darkened areas of the narrow side need to be covered up by a masking element in front of them to achieve a homogeneous illumination pattern.

FIG. 1 and FIG. 2 show the flux of radiation in the area of a light input side of a flat type light conducting body according to a prior-art embodiment of a lighting device.

It is an object of this present invention to improve a lighting device for vehicles in such a way that light input into a flat type light conducting body is enhanced.

SUMMARY OF THE INVENTION

This object of the invention is achieved by a lighting device for vehicles which comprises a flat type light conducting body having two opposed flat sides at which light is transmitted from a light coupling or input side of said light conducting body to a light decoupling or output side thereof by total deflection, and a narrow side at the light input end along which a plurality of spaced-apart light elements are fitted for light input into the light conducting body, said narrow side extending in at least an extension plane perpendicular to the flat sides, characterized by the fact that the narrow side (4) is uneven at least in a light input section (12) thereof that constitutes a light input position (12).

The particular advantage of this present invention resides in that an uneven configuration of one of the narrow sides of the flat type light conducting body on a light input side permits an improved utilization of the light emitted from the light elements and an adaption to specific marginal design conditions in the ambience of the lighting device. Advantageously it is particularly the efficiency of light conductance and illumination of the flat type light conducting body that can be improved.

A variant of the present invention provides for a narrow side of the light conducting body on the light input side to have a recess with an optionally shaped light input face or a cylindrical recess in the light input section. This configuration of the light input sections according to this invention advantageously permits a neutral light entrance such that also the relatively shallow light rays that enter under a comparatively small angle relative to the extension plane of the narrow side undergo virtually no directional change during input. It is an advantage, therefore, that a masking element to cover up the junction areas between the input sections in which radiant intensity is less may be of smaller size and/or the spacings between adjacent light elements may be larger when using dimensionally unchanged masking units.

According to a modification of this present invention the narrow side in the light input side comprises a minimum of two cylindrical beads at least in the light input section which are each extending in longitudinal direction of the narrow side. On their sides facing each other these cylindrical beads are joined by a cavity established by a plumb line. This offers the advantage that a light fraction axially emitted in the light input section may be refracted toward the flat sides while at the same time preventing this light fraction from emitting on an opposite side of the light conducting body without reflection. The course and/or conductance of the light inside the light conducting body may hence be advantageously improved while avoiding that the axial light fraction may radiate through the light conducting body unused.

Another modification of this present invention provides for junction areas between the light input sections on the narrow side which are even, stepped or fitted with parabolic indentations.

In a first embodiment with even junction areas the light conducting bodies have optical faces in the light input sections only to conduct the light through the interior of the light conducting body with total reflection.

The embodiment comprising junctions with parabolic indentations permits a stronger orientation of input light in an area of the light conducting body that extends into a light input section. In that case, a relatively convergent light band is generated in a plane extending parallel to the flat sides and into the light input section. In particular, the illumination of the flat sides of the light conducting body may thereby be influenced such that the radiant intensity is in spots of the flat sides higher than the basic luminosity that is propagated through the light conducting body.

An arrangement with stepped indentations permits that the narrow side of the light conducting body facing the light input side may be curved. Hence the entire light conducting body may advantageously be provided in the form of a curved plate.

According to a modification of the present invention it is possible to form an elliptical light input element to the light input section which protrudes perpendicularly from the extension plane of the narrow side. A relatively concentrated introduction of light into the narrow side of the light conducting body may be achieved this way.

A further modification of the invention resides in that on the one hand a light input element converging in light flow direction may be arranged in the light input section of the light conducting body which extends substantially parallel to the extension plane of the narrow side such that light will be entered laterally from the narrow side with the light element oriented toward the extension plane of the light conducting body rather than perpendicularly to said narrow side. On the other hand is the narrow side in the light input area provided with at least one indentation which juxtaposes the marginal edge of the light input element and which is adapted to the surface of said light input element. According to this variant of the invention there are refractive optical faces (indentations) and total reflective optical faces (light input element) provided through which the light entering laterally from the light element will be deflected toward the flat type light conducting body.

BRIEF DESCRIPTION OF THE DRAWINGS

Exemplary embodiments of this present invention will now be described with reference to the accompanying drawings in which:

FIG. 6 is a perspective partial view of a lighting device with a flat type light conducting body according to a second embodiment of the invention;

FIG. 7 is a cross-section through the lighting device shown in FIG. 6;

FIG. 8 is a longitudinal section through a lighting device with a flat type light conducting body according to a third embodiment in which an exemplary course of the light rays introduced into a light input section is shown;

FIG. 13 a cross-section through a lighting device according to a fifth embodiment which comprises a curved flat type light conducting body within a light input section;

FIG. 14 a larger-scale representation of the lighting device according to FIG. 13;

FIG. 15 a perspective top view of the lighting device according to the fifth embodiment;

DETAILED DESCRIPTION OF THE INVENTION

Figure 3:
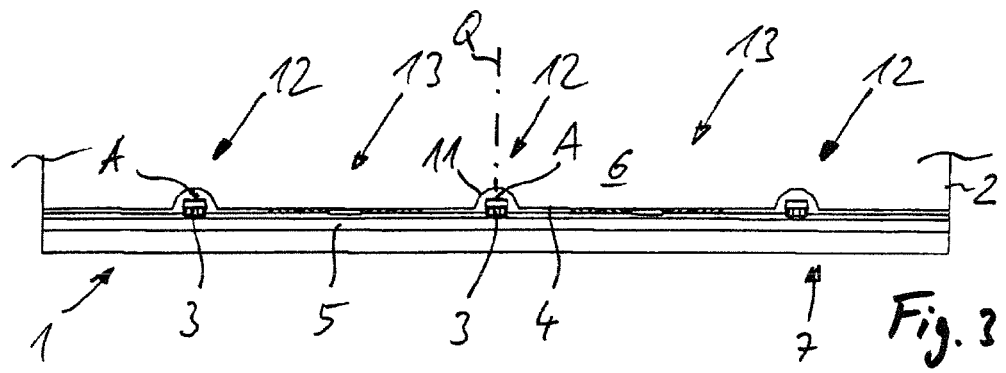
FIG. 3 is a side view of a lighting device with a flat type light conducting body in a first embodiment.
Figure 4:
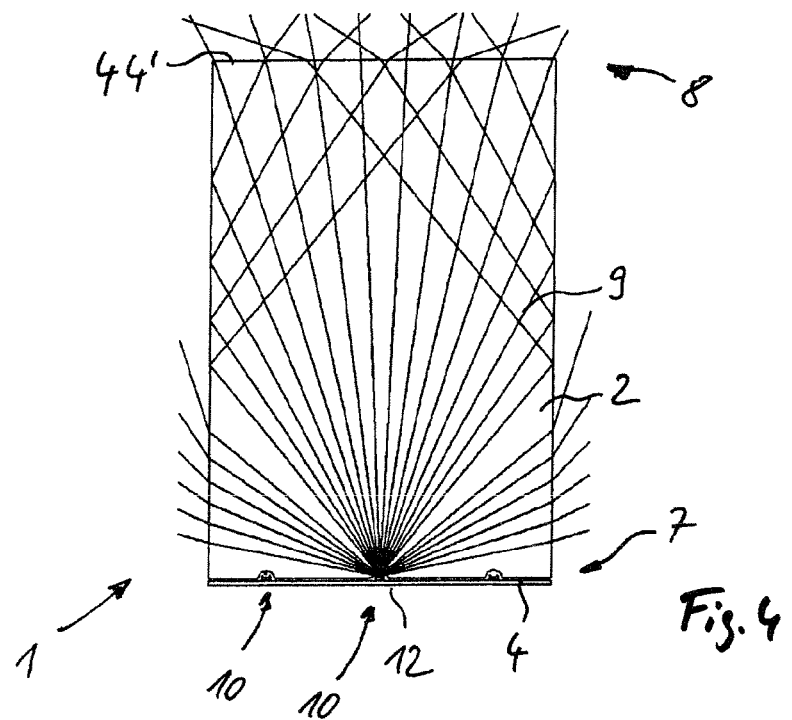
FIG. 4 is a partial side view of the lighting device according to FIG. 1 which illustrates light rays introduced via a light input section on a narrow side of the flat type light conducting body.
Figure 5:
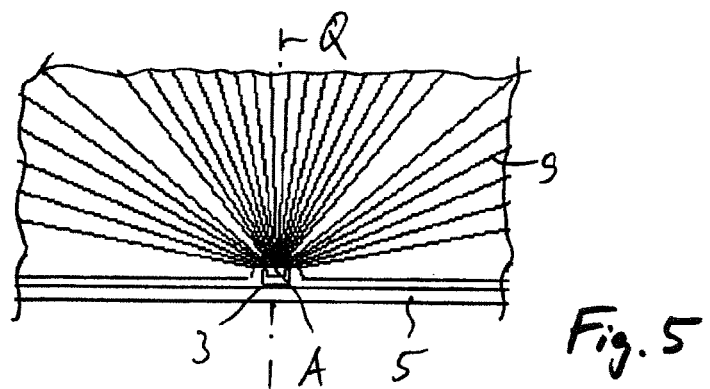
FIG. 5 is a larger-scale representation of the light input section of the flat type light conducting body according to the first embodiment.

A first embodiment of a lighting device 1 for vehicles is shown in FIGS. 3 to 5. This lighting device 1 substantially comprises a flat type light conducting body 2 and a plurality of light elements 3 disposed on a narrow side 4 of said light conducting body in a spaced-apart arrangement. The light elements 3 may be provided in the form of LEDs (LED chips) that are placed on one common even circuit board 5.

The flat type light conducting body 2 is plate-shaped and comprises two large-area flat sides 6, 6' extending parallel to each other.

The light conducting body 2 is preferably of rectangular cross-section with narrow sides adjoining the marginal edges of said flat sides 6, 6' at each end. The narrow side 4 of the light conducting body 2 that faces the light elements 3 is disposed on a light input side 7 while an opposite narrow end 44' of the light conducting body 3 is arranged on a light output side 8. Total reflection of input light 9 takes place via the flat sides 6, 6' and the light is preferably emitted to the ambience via the light output side 8. A flat side 6 may have an optical structure if so required to ensure full-face illumination toward the opposite flat side 6'. Identical components and/or component functions in the various embodiments are denoted by identical reference numerals.

As may clearly be seen from FIGS. 3 to 5 the narrow side 4 of the light conducting body 2 is provided with a cylindrical recess 11 and hence uneven in its light input positions 10. This means that the narrow side 4 has a light input section 12 in each of the light input positions with any two adjacent light input sections 12 interconnected by even junction areas 13 of said narrow side 4. The cylindrical recess 11 has a centerline A that extends perpendicular to the flat sides 6, 6'. The LED light element 3 is disposed within the centerline area such that the light rays 9 entering the light conducting body 2 under a relatively large acute angle relative to a transversal plane Q are being introduced into the light conducting body 2 with virtually no change of direction. It is an advantage that a masking element to cover up the light input section 12 may be of smaller size.

The cylindrical recess 11 preferably comprises a semi-cylindrical input face of a diameter D that is larger than the transversal extension of the light elements 3. This diameter D of said semi-cylindrical input face 11 may be in the range from 1 mm to 4 mm.

Figure 1:
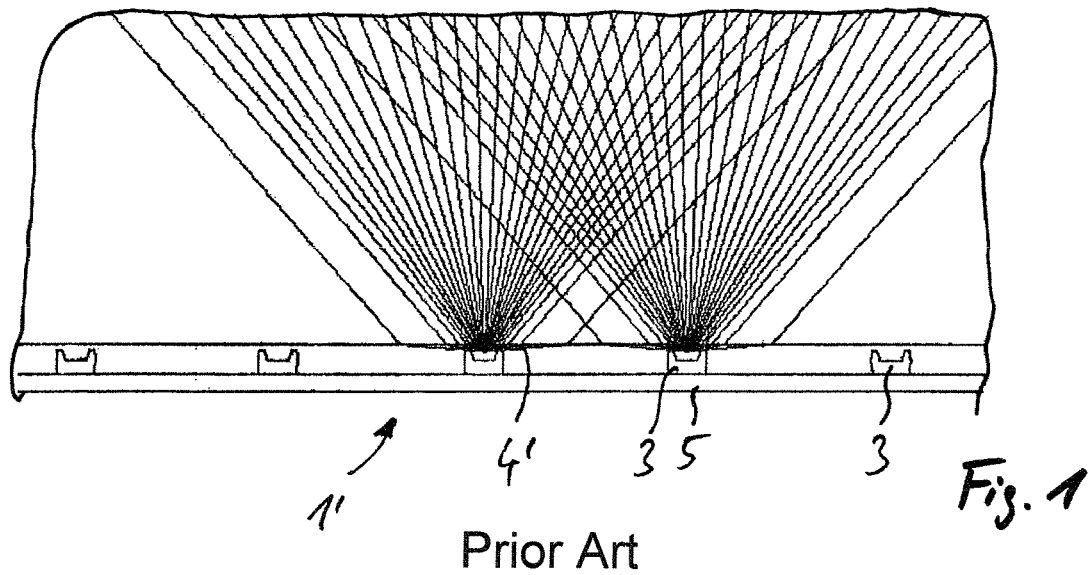
FIG. 1 is a partial longitudinal section through a flat type light conducting body in a prior-art embodiment.
Figure 2:
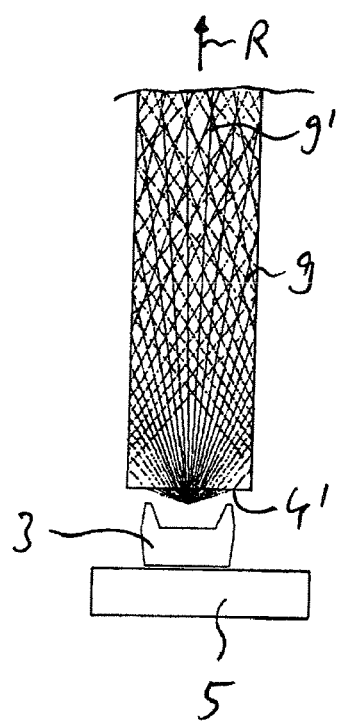
FIG. 2 is a partial cross-section through the light conducting body of said prior-art embodiment according to FIG. 1.

Compared to the prior art version of a lighting device 1' according to FIG. 1 and FIG. 2 with a continuously even narrow side 4' it is possible to reduce the size of the masking element disposed in front of the light conducting body to cover up the light input area.

In a not-shown embodiment the recess 11 may also be provided as an optionally shaped input face such that light coupling or input may be adapted to the shape of the circuit board.

In a second embodiment of a lighting device 15 as per FIG. 6 and FIG. 7 a flat type light conducting body 16 may be provided which other than in case of the prior-art lighting device 1' and the lighting device 1 of the first embodiment of this present invention comprises on the light input side 7 two cylindrical beads 17, 17' extending along the longitudinal axis of the narrow side 4. These cylindrical beads 17, 17' are continuous such as to make the entire narrow side 4 uneven in longitudinal direction. According to a not-shown embodiment of the present invention said cylindrical beads 17, 17' may also be provided solely in the light input positions 10 to which the light elements 3 are preferably placed on a common circuit board. The two cylindrical beads 17, 17' extend from opposing marginal edges under an obtuse opening angle such that a plumb line 18 is established by the discontinuously converging cylindrical beads 17, 17'. This plumb line 18 forms a cavity on the narrow side 4 in longitudinal direction thereof which in coaction with the curvature of the cylindrical beads 17, 17' enables a light fraction 9' axially emitted from the light elements 3 to the flat sides 6, 6' of the light conducting body 16 to be refracted. Advantageously, this light fraction 9' also can be utilized due to total reflection at the flat sides 6, 6' and will not be passed through the light conducting body 2 unused the way it would be in case of the prior-art lighting device 1' according to FIG. 2. It is due to the evenness of the narrow side 4' there that the light fraction 9' emitted in axial direction R will be carried through the light conducting body 2' substantially in that axial orientation R.

As will be seen particularly from FIG. 7 the plumb line 18 is disposed in a longitudinal center plane of the light conducting body 16 and extends parallel to marginal edges 19 of the narrow side 4.

Figure 9:
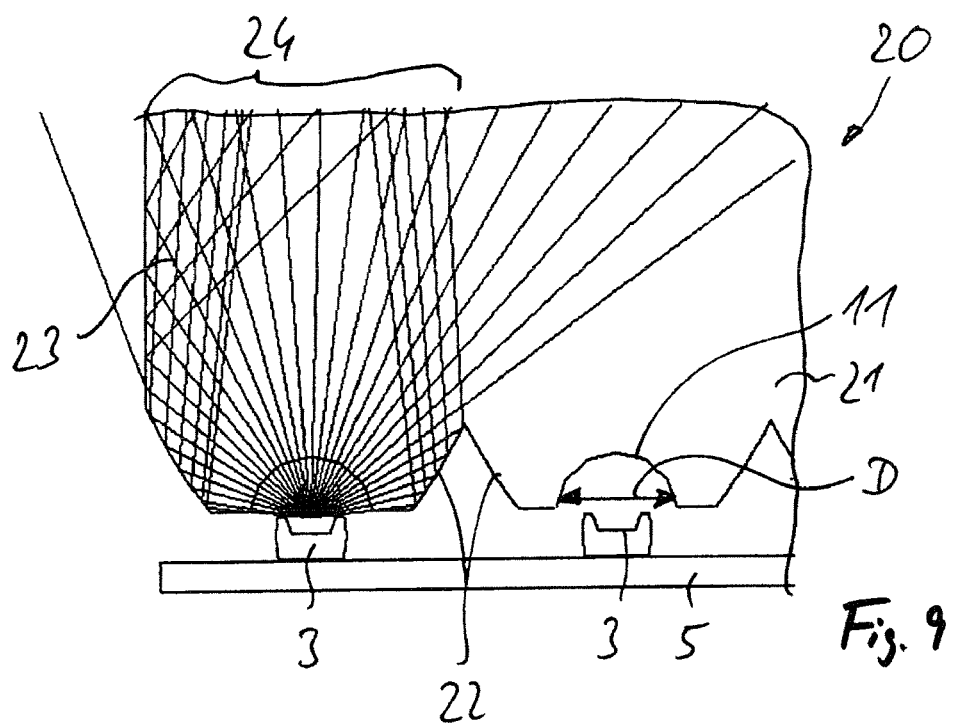
FIG. 9 is a larger-scale representation of the light input section of a narrow side of the light conducting body according to FIG. 8.

Other than the first embodiment of the present invention does a lighting device 20 of a third embodiment according to FIG. 8 and FIG. 9 comprise a light conducting body 21 which is provided with a parabolic indentation 22 in each of the junction areas 13 of the narrow side 4. In coaction with the cylindrical recesses 11 in the light input section 12 of the narrow side 4 there is a stronger orientation of the input light 23 achieved to thereby create areas/zones with increased radiant intensity on the light output side 8. These may for instance be bright stripes which are prominent over a basic luminosity of the light conducting body 21. Light 23 may hence form a convergent light band 24 that is passed through the light conducting body 21 under a predetermined angle parallel to the flat sides 6, 6'.

Figure 10:
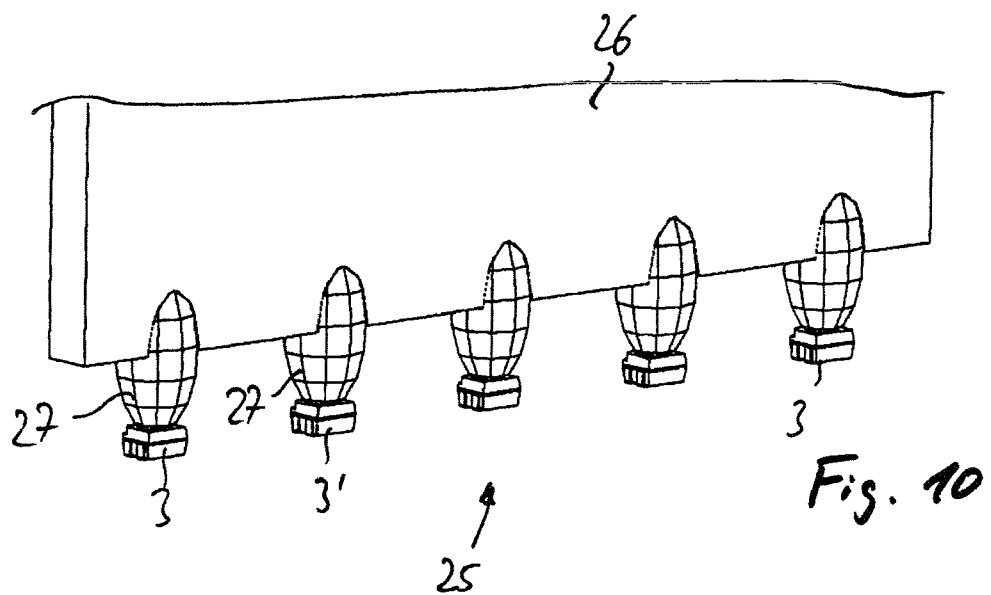
FIG. 10 is a perspective side view of a lighting device in the area of a light input side according to a fourth embodiment in which spaced-apart ellipsoidal light input elements protrude from a narrow side of the flat type light conducting body.
Figure 11:
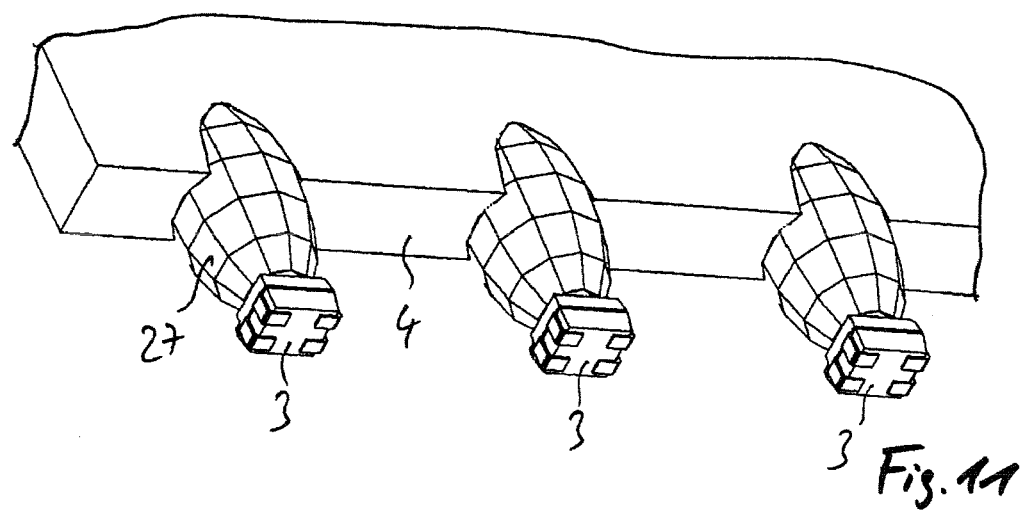
FIG. 11 a perspective partial view of the narrow side of the light conducting body according to FIG. 10.
Figure 12:
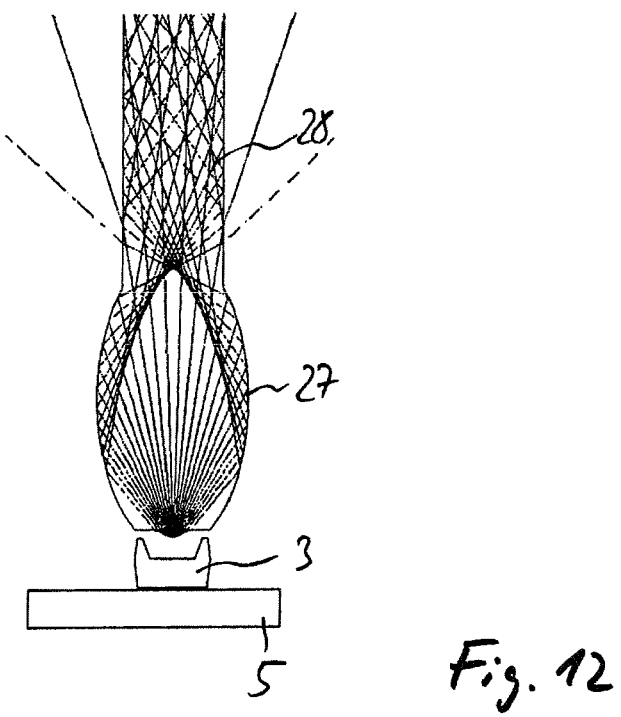
FIG. 12 a cross-section through the lighting device of the fourth embodiment within a light input section.
Figure 16:
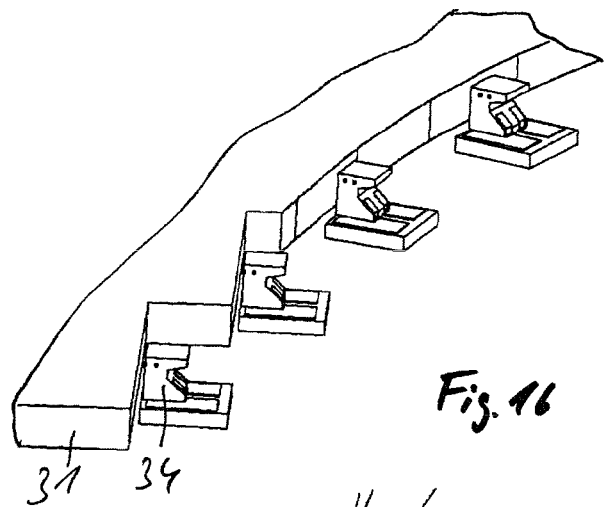
FIG. 16 a larger-scale representation of a partial area of a light input side of the lighting device according to the fifth embodiment.
Figure 17:
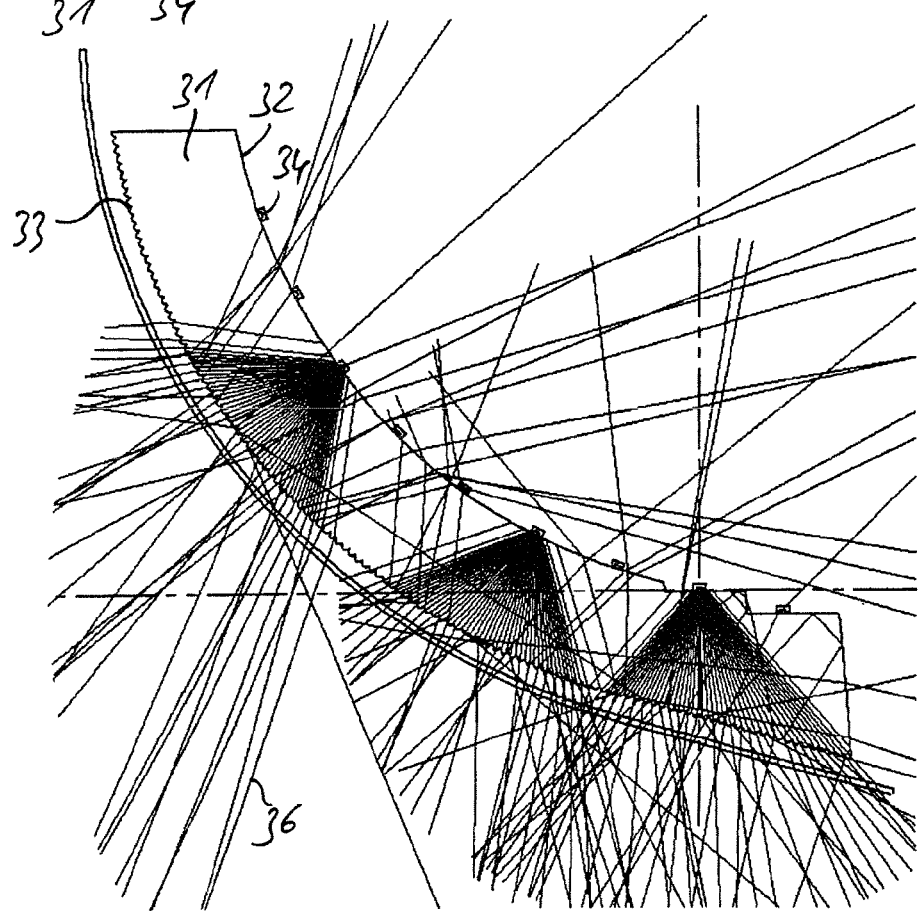
FIG. 17 is a top view of the lighting device according to the fifth embodiment in which light bundles introduced into different light input sections are shown.

A fourth embodiment of the lighting device 25 according to FIG. 10 to FIG. 12 includes a light conducting body 26 that in each light input position 10 comprises an ellipsoidal light input element 27 which on the narrow side 4 protrudes perpendicularly from an extension plane 28 thereof. An advantage offered by this arrangement is that the light 28 emitted by the light elements 3 can be effectively captured and introduced into the light conducting body 26.

A curved flat type light conducting body 31 is provided in a fifth embodiment of a lighting device 30 according to FIG. 13 to FIG. 17 of which a narrow side 32 on the light input side 7 and a narrow side 33 on the light output side 8 each have a curved shape. Laterally emitting light elements 34 are arranged on a circuit board 35 that extends parallel to the flat sides 6, 6' of the light conducting body 31. The narrow side 32 on the light input side 7 is stepped with the light 36 emitted by LEDs 34 impinging a substantially even light input section 12 of the narrow side 32. Advantageously, the lighting device 30 is space saving because the circuit board 35 may be arranged parallel to the flat type light conducting body 31.

In a not-shown embodiment it is possible to allocate conventional type light emitting diodes 3 also to the narrow side 32 in which case the circuit boards 35 of said LEDs 3 are stepped and arranged parallel to the narrow side 32 as well. The circuit board may for instance be flexible also.

Figure 18:
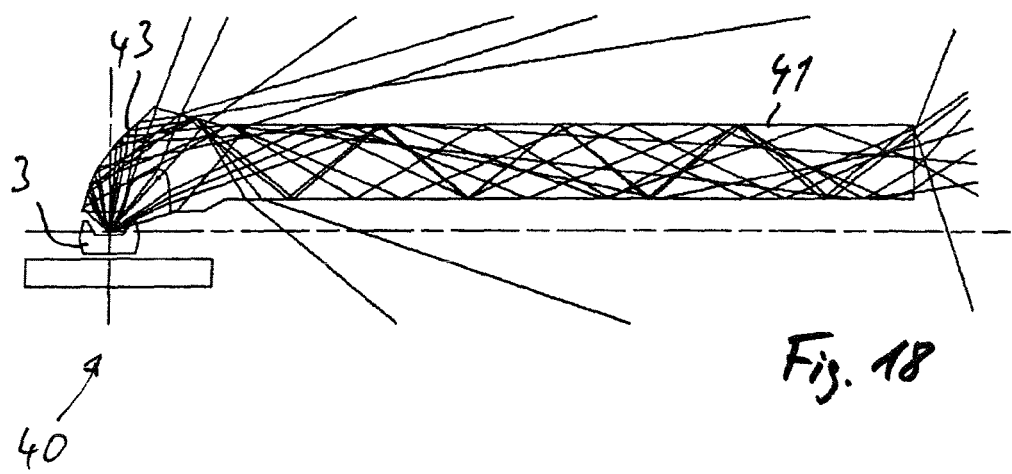
FIG. 18 is a cross-section through a lighting device according to a sixth embodiment in which light rays are shown.
Figure 19:
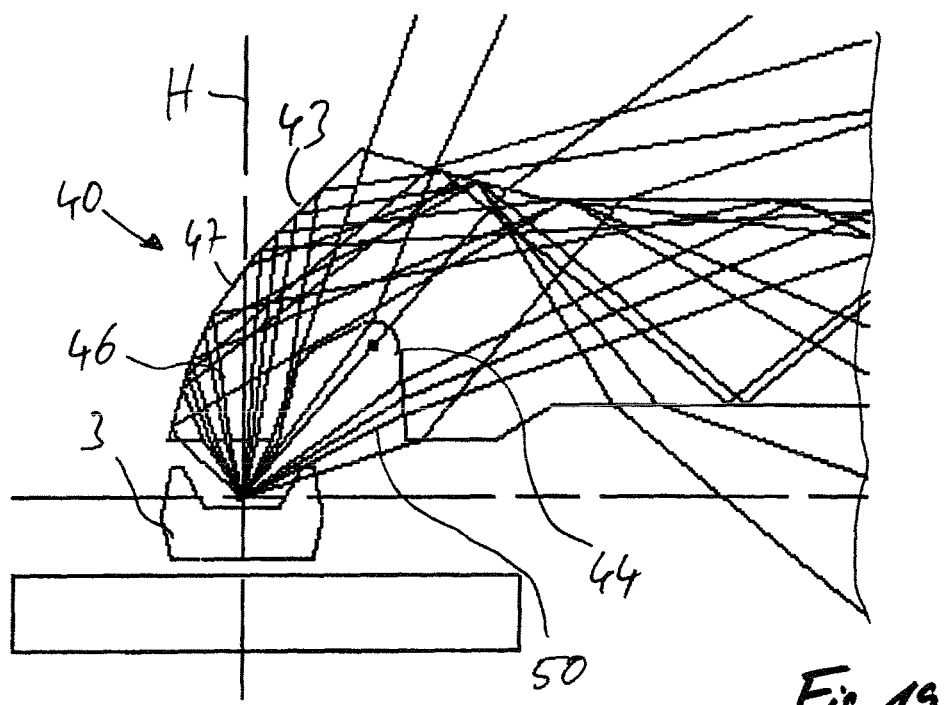
FIG. 19 is a larger-scale representation of the lighting device according to the sixth embodiment within a light input section.
Figure 20:
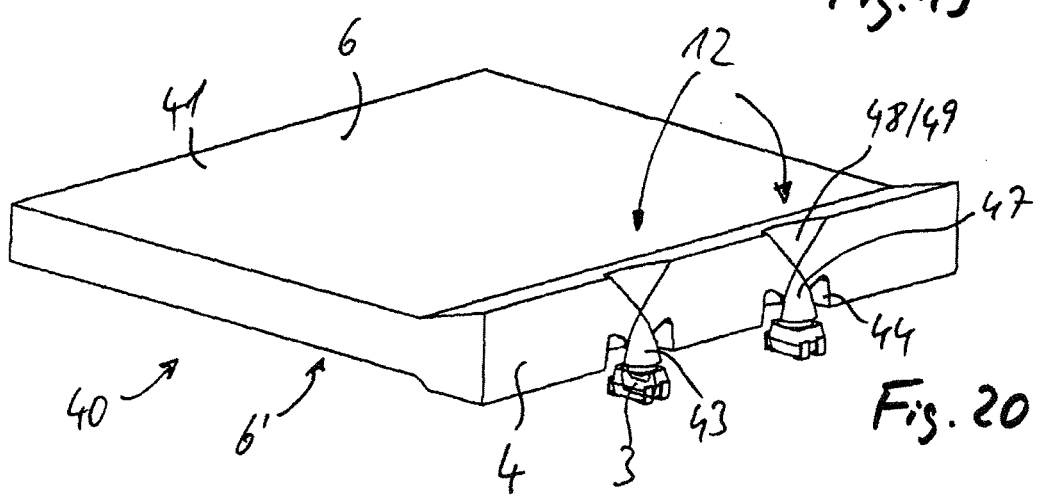
FIG. 20 is a perspective view of the lighting device according to the sixth embodiment.
Figure 21:
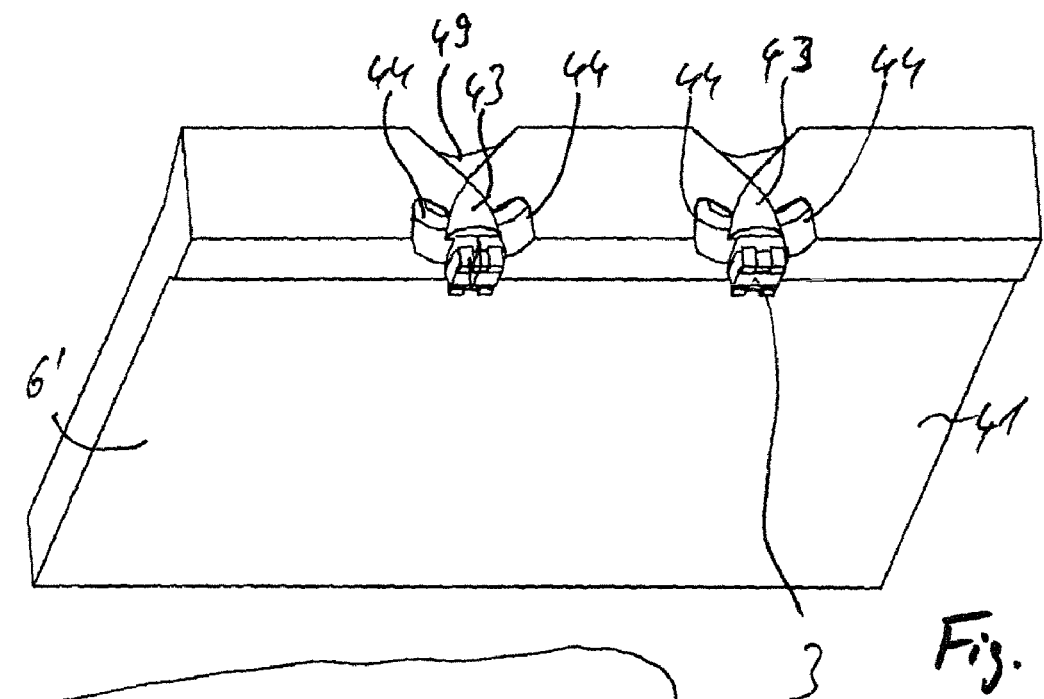
FIG. 21 is a perspective view of the lighting device according to the sixth embodiment as viewed laterally from below to a narrow side thereof into which light is introduced.
Figure 22:
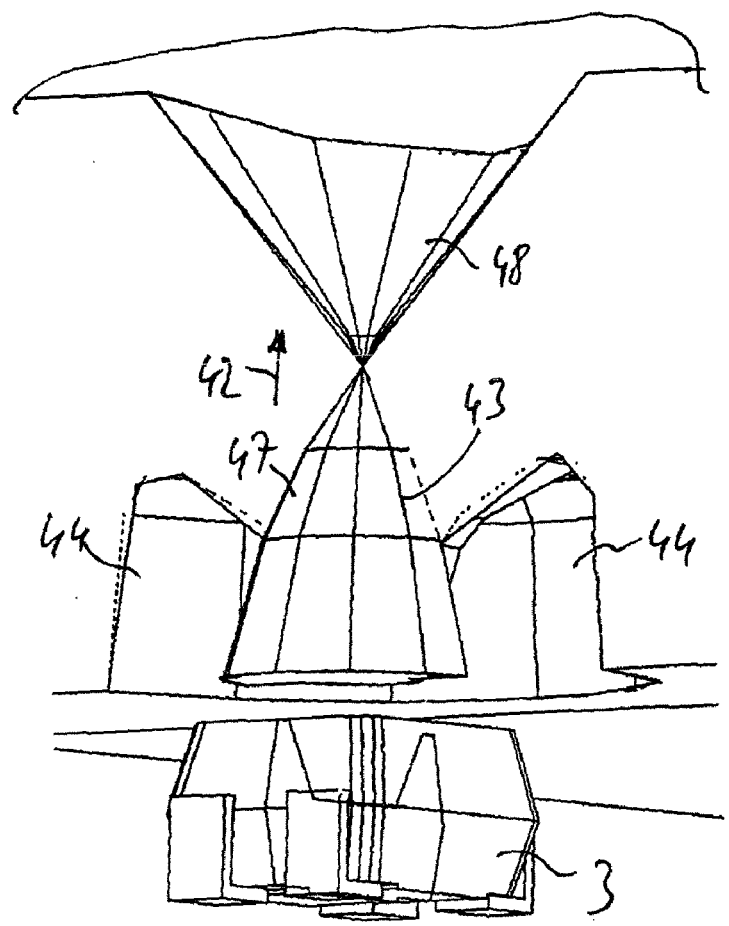
FIG. 22 a larger-scale top view of the narrow side of the lighting device according to the sixth embodiment within a light input section.

A sixth embodiment of a lighting device 40 according to FIG. 18 to FIG. 20 includes a flat type conducting body 41 which on the narrow side 4 comprises on the one hand in the area of the light input sections 12 a number of tapered and in light flux direction 42 converging light input elements 43 in alignment with the light elements 3 and on the other hand a number of indentations 44 adjoining said light input elements 43 on the opposite side. Light input elements 43 and indentations 44 extend perpendicular to the extension plane of the light conducting body 41 and to a laterally arranged light element 3. These light elements 3 as well may be disposed on a common circuit board extending parallel to flat sides 6, 6' of the light conducting body 41. The light input elements 43 and the indentations 44 improve the input of light from those light elements 3 whose axial main radiation direction H is not perpendicular to the narrow side 4, but virtually parallel therewith or under a small angle thereto. Total reflection of the first light fraction as introduced toward the narrow side 4 takes place within the light input element 43 that protrudes from said narrow side 4. It is to this end that the light input element 43 is provided with a tapered peripheral section 47 and a deflecting section 48 adjoining said latter in light flux direction 42 and while forming a flat 49 merges with the narrow side 4. On the other hand is a second fraction 50 of the light emitted by the light elements 3 refracted solely at the indentations 44 and by way of total reflection via the flat sides 6, 6' of the light conducting body 41 passed on inside the latter. It is due to the combination consisting of a light input element 43 achieving total reflection of the first light fraction 46 and indentations 44 refracting a second light fraction only that an improvement of light input from laterally arranged LEDs 45 can be achieved.

It goes without saying that the variants of the invention as described in terms of exemplary embodiments may be combined with one another. The cylindrical beads 17, 17' of the second embodiment for instance may be combined with the cylindrical recess 11 in the light input position 10 of the first embodiment.

The invention claimed is:

1. A lighting device for vehicles which comprises a flat type light conducting body having two opposed flat sides at which light is transmitted from a light coupling or input side of said light conducting body to a light decoupling or output side thereof by total deflection, and a narrow side at the light input end along which a plurality of spaced-apart light elements are fitted for light input into the light conducting body, said narrow side extending in at least an extension plane perpendicular to the flat sides, wherein the narrow side (4) is uneven at least in a light input section (12) thereof that constitutes a light input position (12), wherein the light input section (12) is an a rotation-symmetric ellipsoidal light input element (27) having a truncated portion wherein the light input element is formed to the narrow side (4) and which protrudes perpendicularly from the extension plane of the narrow side (4), and wherein a single light element is fitted adjacent to the truncated portion for light input to each respective light input element (27).

* * * * *